United States Patent [19]
Shimomura

[11] Patent Number: 5,995,664
[45] Date of Patent: Nov. 30, 1999

[54] INFORMATION RECOGNITION APPARATUS FOR RECOGNIZING RECOGNITION OBJECT INFORMATION

[75] Inventor: Hideki Shimomura, Tokyo, Japan

[73] Assignee: NEC Corporation, Tokyo, Japan

[21] Appl. No.: 08/880,769

[22] Filed: Jun. 23, 1997

[30] Foreign Application Priority Data

Jun. 21, 1996 [JP] Japan ................................. 8-181423

[51] Int. Cl.⁶ ............................. G06K 9/62; G01L 5/06
[52] U.S. Cl. ......................... 382/229; 382/224; 382/228; 704/231; 704/251
[58] Field of Search .................................. 382/224, 221, 382/226, 227, 228, 229, 230, 231, 185, 215, 155; 704/251, 231, 240, 155, 256; 707/532, 533

[56] References Cited

U.S. PATENT DOCUMENTS

| | | | |
|---|---|---|---|
| 4,799,271 | 1/1989 | Nagasawa et al. | 382/231 |
| 5,161,245 | 11/1992 | Fenwick | 382/231 |
| 5,287,415 | 2/1994 | Chefalas et al. | 382/215 |
| 5,392,363 | 2/1995 | Fujisaki et al. | 382/229 |
| 5,473,705 | 12/1995 | Abe et al. | 382/229 |
| 5,652,898 | 7/1997 | Kaji | 395/760 |
| 5,675,665 | 10/1997 | Lyon | 382/229 |
| 5,754,695 | 5/1998 | Kuo et al. | 382/228 |
| 5,799,276 | 8/1998 | Komissarchik et al. | 704/251 |
| 5,812,698 | 9/1998 | Platt et al. | 382/228 |

FOREIGN PATENT DOCUMENTS

| | | | |
|---|---|---|---|
| 1-007276 | 1/1989 | Japan | G06K 9/72 |
| 1-113865 | 5/1989 | Japan | G06F 15/30 |
| 2-173886 | 7/1990 | Japan | G06K 9/72 |
| 4-328692 | 11/1992 | Japan | G06K 9/03 |
| 7-065107 | 3/1995 | Japan | G06K 9/00 |
| 7-116606 | 5/1995 | Japan | G06K 9/00 |
| 7-66423 | 7/1995 | Japan | G06K 9/62 |
| 7-262320 | 10/1995 | Japan | G06K 9/72 |

OTHER PUBLICATIONS

Torimoto et al., "Japanese Address Reader–Sorter, Model TR–17", (1990) pp. 149–152.

Ishikawa et al., "OCR Address Reading/Letter Sorting Machine for the Ministry of Posts and Telecommunications of Japan", NEC, vol. 44, No. 3, (1991) pp. 25–30.

*Primary Examiner*—Matthew C. Bella
*Attorney, Agent, or Firm*—Foley & Lardner

[57] ABSTRACT

The invention provides an information recognition apparatus for recognition of an address or the like which can recognize recognition object information, which is inputted in the form which does not have punctuations or element designations, at a high speed and with a high degree of accuracy. An element word recognition unit detects element word candidates of each information element of recognition element information and likelihoods of the element word candidates. A record number acquisition unit retrieves a record storage unit to acquire, for each element word candidate detected by the element word recognition unit, a record number of a record including the element word candidate. A likelihood calculation unit calculates likelihoods of the records using corresponding likelihood counters. A result discrimination unit discriminates a record to be determined as a recognition result of the recognition object information based on count values of the likelihood counters, and a result extraction unit extracts a record to be determined as a recognition result from the record storage section based on a result of the discrimination of the result discrimination unit.

8 Claims, 17 Drawing Sheets

| PLACE NAME | LIKELIHOOD |
|---|---|
| （川崎市　宮前区）宮崎 | 10 |
| （川崎市　宮前区）宮前平 | 8 |
| （川崎市　宮前区）有馬 | 4 |

| BLOCK NUMBER | LIKELIHOOD |
|---|---|
| 4 | 10 |

| SUB-BLOCK NUMBER | LIKELIHOOD |
|---|---|
| 7 | 10 |
| 17 | 7 |

| HOUSE NUMBER | LIKELIHOOD |
|---|---|
| ? | 0 |

| BUILDING NAME | LIKELIHOOD |
|---|---|
| ? | 0 |

| ROOM NUMBER | LIKELIHOOD |
|---|---|
| 207 | 10 |
| 201 | 5 |

| INDIVIDUAL NAME | LIKELIHOOD |
|---|---|
| 日電太郎 | 10 |
| 日電次郎 | 10 |

| RECORD NUMBER | PLACE NAME | BLOCK NUMBER | SUB-BLOCK NUMBER | HOUSE NUMBER | BUILDING NAME | ROOM NUMBER | INDIVIDUAL NAME |
|---|---|---|---|---|---|---|---|
| 0001 | 有馬 | 1 | 1 | 1 | | | 川崎太郎 |
| 0002 | 有馬 | 1 | 1 | 2 | | | 有馬花子 |
| ⋮ | | | | | | | |
| 2014 | 宮崎 | 1 | 1 | 1 | | | 日電次郎 |
| ⋮ | | | | | | | |
| 2039 | 宮崎 | 4 | 7 | 6 | 五月荘 | 201 | 日電太郎 |
| 2040 | 宮崎 | 4 | 7 | 6 | 五月荘 | 202 | 五月三郎 |
| ⋮ | | | | | | | |
| 2135 | 宮崎 | 4 | 17 | 1 | 弥生荘 | 207 | 弥生三郎 |
| 2136 | 宮崎 | 4 | 17 | 2 | | | |
| ⋮ | | | | | | | |
| 3501 | 宮前平 | 1 | 2 | 3 | 桜花荘 | 201 | 日電太郎 |
| ⋮ | | | | | | | |

FIG. 10

| | RECORD NUMBER | LIKELIHOOD |
|---|---|---|
| (PLACE NAME, 有馬) | 「0001~0523」 | 「4」 |
| (PLACE NAME, 宮崎) | 「2014~3500」 | 「10」 |
| (PLACE NAME, 宮前平) | 「3501~3813」 | 「8」 |
| (BLOCK, 4) | 「…,2030~2146,…」 | 「10」 |
| (SUB-BLOCK, 7) | 「…,2020~2045,…」 | 「10」 |
| (ROOM, 207) | 「…,2135,…」 | 「10」 |
| (ROOM, 201) | 「…,2039,3501,…」 | 「5」 |
| (INDIVIDUAL NAME, 日電太郎) | 「2039,3501」 | 「10」 |
| (INDIVIDUAL NAME, 日電太郎) | 「2014」 | 「10」 |

FIG. 17

REPRESENTATIVE REPRESENTATION | DEFORMATION REPRESENTATION

| 日の出町 | 日の出町　日ノ出町　日乃出町　ヒノデチョウ |
|---|---|
| 筑波 | 筑波　つくば |
| ⋮ | |

INFORMATION RECOGNITION APPARATUS FOR RECOGNIZING RECOGNITION OBJECT INFORMATION

BACKGROUND OF THE INVENTION

1. Field of the Invention

This invention relates to an information recognition apparatus for recognizing a series of pieces of information such as an address or customer transaction data which is composed of a plurality of information elements for each of which a predetermined number of words each of which can make an information element are determined making use of a character recognition technique or a speech recognition technique.

2. Description of the Related Art

An address, customer transaction data or the like is composed of a plurality of information elements. For example, an address is composed of such elements as an urban or rural prefecture, a municipal district name, a street name, a square (block, sub-block and house numbers), a building name, a room number and so forth, and customer transaction data is composed of a customer number, an individual name and so forth. Further, for an address, customer transaction data or the like, a predetermined number of element words which may possibly make such elements are determined for each element. For example, the element words which may possibly make an urban or rural prefecture name in Japan are totalling 47 words such as Tokyo-to, Hokkai-do, Osaka-fu and Akita-ken.

If it is tried to recognize an address, customer transaction data or the like using a character recognition technique or a speech recognition technique, with any recognition technique available at present, it is impossible to recognize all words correctly and uniquely. Further, some element word may possibly be omitted when data are inputted. Accordingly, if words obtained as a result of recognition are merely outputted, some error in recognition or lack of some element may possibly occur.

Thus, it is a common practice to collate a result of recognition with data registered in advance to raise the accuracy in recognition. One of such systems is disclosed, for example, in Japanese Patent Laid-Open Application No. Heisei 1-113865 wherein, for all customers, customer transaction data including an account number and a customer name written in predetermined places of a cutform upon transaction by a customer are stored in advance into a customer information storage unit, and in order to recognize customer transaction data written on another cutform by the customer later, an account number and a customer name written on the cutform are recognized using a hand written character recognition technique, and then a result of the recognition is compared with the customer transaction data of all customers stored in the customer information storage unit to detect all customer transaction data likelihoods. Thereafter, customer transaction data to be determined as a recognition result is determined based on the likelihoods of the customer transaction data.

Another system is disclosed in Japanese Patent Laid-Open Application No. Heisei 4-328692 wherein elements which are paired with each other such as an individual name and 'kana'-letters attached to Chinese letters of the individual name are registered in a word dictionary unit, and in order to recognize an individual name and attached 'kana'-letters written in a predetermined place or places (frame or frames), a plurality of candidate characters and all of the pairs registered in the word dictionary unit are collated with each other to detect likelihoods of the pairs registered in the word dictionary unit. Then, the candidate characters are registered into a candidate word table in a descending order of the likelihood.

In the systems described above, information of all of actually existing recognition objects each of which can be represented by a combination of element words is stored in advance in a storage unit, and when to recognize information of a recognition object, a result of recognition by a character recognition technique is collated with all of the recognition object information stored in advance in the storage unit to calculate likelihoods of the recognition object information. Further, the two systems described above presuppose that elements of recognition object information are written in a predetermined column or frame.

The systems described above have the following problems.

First, the systems described above cannot be applied to an application wherein kinds of element words are not designated by a column or frame in advance. For example, when it is tried to recognize a freely written character train such as an address on a mail matter or to recognize an address or the like based on a speech recognition technique, neither the kinds of element words nor the character punctuations or word punctuations are settled with the address or the like. Accordingly, if it is tried to apply the systems to such application, it is required to assume all character punctuations, word punctuations and kinds of elements and effect collation processing of all possible combinations of them with all information stored in the storage unit. This requires a large amount of processing and is not therefore practical.

Second, with the systems described above, since a result of recognition of an element word is compared directly with element words in the storage unit, where the same word appears several times in the storage unit, the same likelihood calculation processing is performed several times accordingly. Thus, the systems are disadvantageous in that the efficiency is low.

Third, several elements have different representations. For example, in regard to an address, for representation of the name of a place by characters, such different representations as "筑波市" (Tsukuba-shi) and "つくば市" (Tsukuba-shi) are possible, and for representation of a square such as a block number, a sub-block number and a house number, numerals of "kanji" (Chinese character) and Arabic numerals are used. In order for the systems described above to allow use of such different representations, it is required to store all of possible representations in the storage unit. This requires a large storage capacity for the storage unit and deteriorates the efficiency in likelihood calculation processing very much.

SUMMARY OF THE INVENTION

It is an object of the present invention to provide an information recognition apparatus which can recognize recognition object information, inputted in the form which does not have word punctuations or word designations, at a high speed and with a high degree of accuracy.

It is another object of the present invention to provide an information recognition apparatus which can recognize recognition object information at a high speed and with a high degree of accuracy without a significant increase of a storage capacity irrespective of presence of different representations in the recognition object information.

In order to attain the objects described above, according to the present invention, there is provided an information recognition apparatus for recognizing recognition object information in the form of a series of pieces of information which is composed of a plurality of information elements for each of which a predetermined number of element words each of which can make the information element are determined, comprising a word storage section in which all element words which can make the information elements are stored, a rule storage section in which rules representing a hierarchical relationship of the information elements are stored, element word recognition means for recognizing words in recognition object information, detecting, for each of the information elements in the recognition object information, element word candidates based on a result of the recognition, the stored contents of the word storage section and the stored contents of the rule storage section and detecting likelihoods of the element word candidates, a record storage section in which actually existing recognition object information which can be represented as combinations of element words is stored in the form of records each of which includes record items provided by the information elements of the recognition object information, record number acquisition means for retrieving the record storage section using the element word candidates detected by the element word recognition means successively as a key to acquire, for each of the element word candidates, a record number of a record which includes the element word candidate, likelihood calculation means for providing likelihood counters in a corresponding relationship to the individual record numbers acquired by the record number acquisition means and adding the likelihoods of the element word candidates detected by the element word recognition means to those of the likelihood counters which correspond to the record numbers of the records which include the element word candidates, result discrimination means for discriminating a record to be determined as a recognition result based on the count values of the likelihood counters, and result extraction means for extracting a record to be determined as a recognition result from the record storage section based on a result of the discrimination of the result discrimination means.

In the information recognition apparatus, the element word recognition means recognizes words in recognition object information and detects, for each of the information elements in the recognition object information, element word candidates based on a result of the recognition, the stored contents of the word storage section and the stored contents of the rule storage section, and then detects likelihoods of the element word candidates. Then, the record number acquisition means retrieves the record storage section using the element word candidates detected by the element word recognition means successively as a key to acquire, for each of the element word candidates, a record number of a record which includes the element word candidate. Thereafter, the likelihood calculation means provides likelihood counters in a corresponding relationship to the individual record numbers acquired by the record number acquisition means and adds the likelihoods of the element word candidates detected by the element word recognition means to those of the likelihood counters which correspond to the record numbers of the records which include the element word candidates. The result discrimination means discriminates a record to be determined as a recognition result based on the count values of the likelihood counters, and the result extraction means extracts a record to be determined as a recognition result from the record storage section based on a result of the discrimination of the result discrimination means.

As described above, in the information recognition apparatus, since, upon recognition of recognition object information, the element word recognition means detects, for each of the information elements in the recognition object information, element word candidates and likelihoods of them based on a result of the recognition of the word of the recognition object information, the stored contents of the word storage section and the stored contents of the rule storage section and then the likelihood calculation means calculates likelihoods of records which include the element word candidates based on the element word candidates and the likelihoods of the element word candidates detected by the element word recognition means, the recognition object information which is inputted in a form which does not have word punctuations or element designations can be recognized at a high speed and with a high degree of accuracy. In short, since the amount of the processing of calculating likelihoods of the element word candidates by the element word recognition means is much smaller than that of conventional processing wherein all records stored in the record storage section and the element word candidates are directly collated with each other to detect likelihoods of the records since the number of the element words stored in the word storage section is much smaller than the number of the records stored in the record storage section. Further, since the processing of detecting likelihoods of the records including the element word candidates is mere addition of the likelihoods of the element word candidates to the likelihood counters, the amount of processing required is much smaller than those of the prior art systems. Accordingly, with the information recognition apparatus, high speed processing can be achieved.

Further, since the information recognition apparatus further includes the result discrimination means for discriminating a record to be determined as a recognition result based on the count values of the likelihood counters and the result extraction means for extracting a record to be determined as a recognition result from the record storage section based on a result of the discrimination of the result discrimination means, even where the recognition object information lacks in some element word, a correct recognition result can be obtained.

Preferably, the information recognition apparatus is constructed such that it further comprises a limited record storage section, and record limitation means for retrieving, only when the element word candidates detected by the element word recognition means include an element word candidate which has a high likelihood and corresponds to a record item in which a same word is not frequently included among different element word candidates, the record storage section using the element word candidate as a key and storing records which include the element word candidate into the limited record storage section, and that the record number acquisition means retrieves, when a record or records are stored in the limited record storage section, the limited record storage section using the element word candidates detected by the element word recognition means successively as a key to acquire, for each of the element word candidates, record numbers of records which include the element word candidate, but retrieves, when no record is stored in the limited record storage section, the record storage section using the element word candidates detected by the element word recognition means successively as a key to acquire, for each of the element word candidates, record numbers of records which include the element word candidate, and the result extraction means extracts a record to be determined as a recognition result from the record storage section or the limited record storage section based on a result of the discrimination of the result discrimination means.

In the information recognition apparatus, the record limitation means retrieves, only when the element word candidates detected by the element word recognition means include an element word candidate which has a high likelihood and corresponds to a record item in which a same word is not frequently included among different element word candidates, the record storage section using the element word candidate as a key, and stores records which include the element word candidate into the limited record storage section. The record number acquisition means retrieves, when a record or records are stored in the limited record storage section, the limited record storage section using the element word candidates detected by the element word recognition means successively as a key to acquire, for each of the element word candidates, record numbers of records which include the element word candidate. Consequently, the recognition processing can be performed at a higher speed.

Preferably, the information recognition apparatus is constructed such that it further comprises an element unification table section in which representative representations and deformation representations of the element words are stored in a corresponding relationship, and element word unification means for outputting those of the element word candidates detected by the element word recognition means which are represented in the representative representations as they are but outputting those of the element word candidates detected by the element word recognition means which are represented in the deformation representations after converted into element word candidates of the representative representations based on the stored contents of the element unification table section, and that the record number acquisition means retrieves the record storage section using the element word candidates outputted from the element word unification means successively as a key to acquire, for each of the element word candidates, a record number of a record which includes the element word candidate.

In the information recognition apparatus, the element word unification means outputs those of the element word candidates detected by the element word recognition means which are represented in the representative representations as they are, but outputs those of the element word candidates detected by the element word recognition means which are represented in the deformation representations after converted into element word candidates of the representative representations based on the stored contents of the element unification table section. Consequently, even if different representations are present in the recognition object information, the recognition object information can be recognized at a high speed and with a high degree of accuracy without a significant increase of a storage capacity.

Preferably, the information recognition apparatus is constructed such that it further comprises a high order candidate storage section, and a high order candidate registration completion flag provided for each of the likelihood counters, and that the likelihood calculation means changes, when a likelihood is added to any of the likelihood counters, a corresponding one of the high order candidate registration completion flags so as to have a value representing completion of registration if the likelihood counter has a count value higher than a threshold value determined in advance and the high order candidate registration completion flag represents incompletion of registration, and stores a record number corresponding to the likelihood counter whose count value is higher than the threshold value into the high order candidate storage section, and the result discrimination means discriminates a record to be determined as a recognition result of the recognition object information based on the count values of the likelihood counters corresponding to the record numbers stored in the high order candidate storage section.

In the information recognition apparatus, the likelihood calculation means changes, when a likelihood is added to any of the likelihood counters, a corresponding one of the high order candidate registration completion flags so as to have a value representing completion of registration if the likelihood counter has a count value higher than a threshold value determined in advance and the high order candidate registration completion flag represents incompletion of registration, and stores a record number corresponding to the likelihood counter into the high order candidate storage section. Thereafter, the result discrimination means discriminates a record to be determined as a recognition result of the recognition object information based on the count values of the likelihood counters corresponding to the record numbers stored in the high order candidate storage section. Since the result discrimination means performs its processing only for the likelihoods of the records of the record numbers stored in the high order candidate storage section, the processing speed can be further increased.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 7 is a schematic view showing an example of recognition object information;

FIG. 8 is a schematic illustration showing an example of output of the element word recognition unit shown in FIG. 1;

FIG. 9 is a schematic view illustrating an example of contents of a record storage unit of the information recognition apparatus of FIG. 1;

FIG. 10 is a schematic view showing an example of output of the record number acquisition unit shown in FIG. 1;

FIG. 17 is a schematic view illustrating an example of contents of an element unification table unit of the information recognition apparatus of FIG. 16.

DESCRIPTION OF THE PREFERRED EMBODIMENTS

Figure 1:
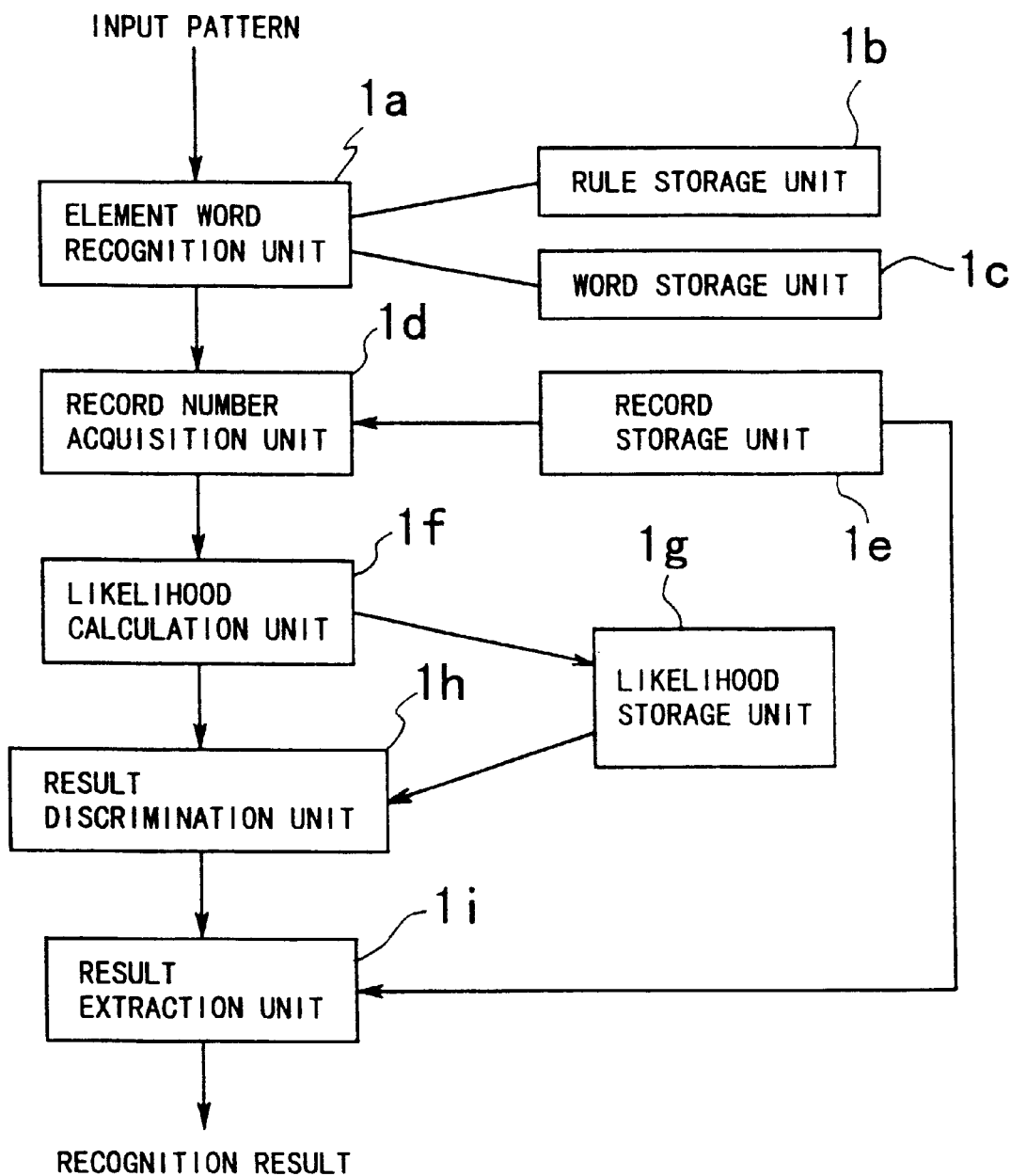
FIG. 1 is a block diagram of an information recognition apparatus showing a first preferred embodiment of the present invention.

Referring first to FIG. 1, there is shown in block diagram an information recognition apparatus to which the present invention is applied. The apparatus shown includes an element word recognition unit 1a, a rule storage unit 1b, a word storage unit 1c, a record number acquisition unit 1d, a record storage unit 1e, a likelihood calculation unit 1f, a likelihood storage unit 1g, a result discrimination unit 1h and a result extraction unit 1i.

The element word recognition unit 1a recognizes each of element words which compose a document or an address and outputs a plurality of candidates together with likelihoods. The element word recognition unit 1a is formed from a plurality of recognition elements corresponding to kinds of elements. Where character recognition for a freely written character train or speech recognition is involved, also the processing of cutting out an element word from an input pattern is performed by the element word recognition unit 1a. The rule storage unit 1b and the word storage unit 1c store word information and rules to be used for recognition processing for each element, respectively.

The record number acquisition unit 1d retrieves the record storage unit 1e to acquire record numbers for uniquely identifying records including element word candidates outputted from the element word recognition unit 1a. The likelihood calculation unit 1f adds likelihoods of element word candidates detected by the element word recognition unit 1a to likelihood counters corresponding to record numbers acquired by the record number acquisition unit 1d. The likelihood counters are included in the likelihood storage unit 1g. The result discrimination unit 1h determines, based on values of the likelihood counters in the likelihood storage unit 1g, a record number of a record to be determined as a recognition result from within those records which have comparatively high likelihoods. The result extraction unit 1i extracts a record corresponding to a record number of a recognition result of the result discrimination unit 1h from the record storage unit 1e.

The word storage unit 1c stores all element words which may possibly make elements of recognition object information. For example, where an address in a certain municipal district is recognition object information, elements of the recognition object information are the municipal district name, street name, block number, sub-block number, house number, building name, room number, individual name and so forth, and the word storage unit 1c stores all element words which may possibly make such elements as described above. It is to be noted that, where a plurality of buildings having the same building name or a plurality of individuals having the same individual name are present in the municipal district, naturally only one of them is stored in the word storage unit 1c.

The rule storage unit 1b stores rules to be applied for recognition of element words in recognition object information. For example, where the recognition object information is an address, connection information representing a hierarchical relationship of place names such that the name of one of the urban and rural prefectures is followed by a municipal district name, which is in turn followed by a street name, a rule of production of a square such that a block number is followed by a punctuation mark, which is in turn followed by a sub-block number, or the like is stored in the rule storage unit 1b.

The element word recognition unit 1a has functions of recognizing each word in recognition object information inputted thereto, detecting element word candidates for each element in the recognition object information based on a result of the recognition of each other, the stored contents of the rule storage unit 1b and the stored contents of the word storage unit 1c, and detecting a likelihood of each element word candidate.

The record storage unit 1e stores actually existing recognition object information, which can be represented by a combination of element words stored in the word storage unit 1c, in the form of a record. The record is formed from record items corresponding to individual elements of recognition object information.

The record number acquisition unit 1d has a function of retrieving the record storage unit 1e using each of element word candidates detected by the element word recognition unit 1a as a key to acquire, for each element word candidate, a record number of a record including the element word candidate.

The likelihood calculation unit 1f has functions of providing likelihood counters in the likelihood storage unit 1g corresponding to individual record numbers acquired by the record number acquisition unit 1d and adding likelihoods of element word candidates detected by the element word recognition unit 1a into those of the likelihood counters which correspond to record numbers of records which include the element word candidates.

The result discrimination unit 1h has a function of discriminating a record number of a record to be determined as a recognition result of recognition object information based on count values of individual likelihood counters provided in the likelihood storage unit 1g.

The result extraction unit 1i has a function of extracting a record to be determined as a recognition result from the record storage unit 1e based on a record number which is a result of determination of the result discrimination unit 1h.

FIGS. 2, 3, 4, 5 and 6 illustrate processing of the element word recognition unit 1a, record number acquisition unit 1d, likelihood calculation unit 1f, result discrimination unit 1h and result extraction unit 1i, respectively.

In the following, operation of the apparatus is described by way of an example wherein an address in "神奈川県川崎市宮前区" (Kanagawa-ken Kawasaki-shi Miyamae-cho) is selected as recognition information.

Figure 7:
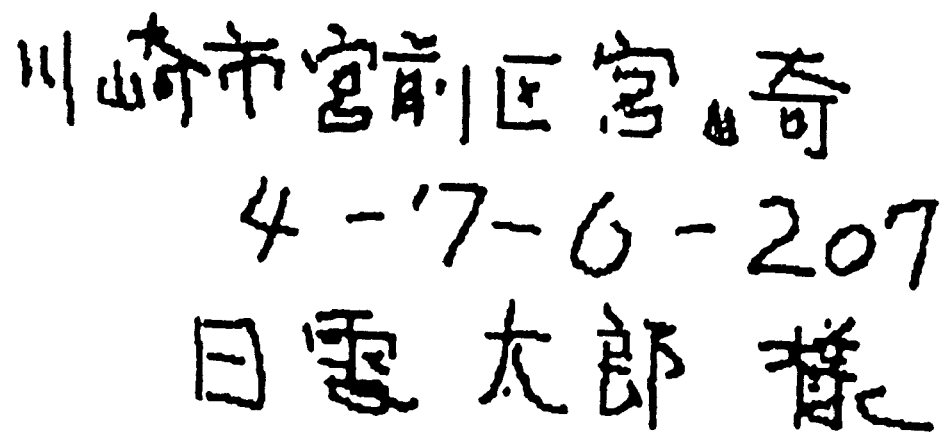

Now, for example, it is tried to recognize such an address written on paper as shown in FIG. 7. Thus, an input pattern corresponding to the address (recognition object information) shown in FIG. 7 is inputted from, for example, an optical pattern inputting apparatus (not shown) to the element word recognition unit 1a.

Figure 2:
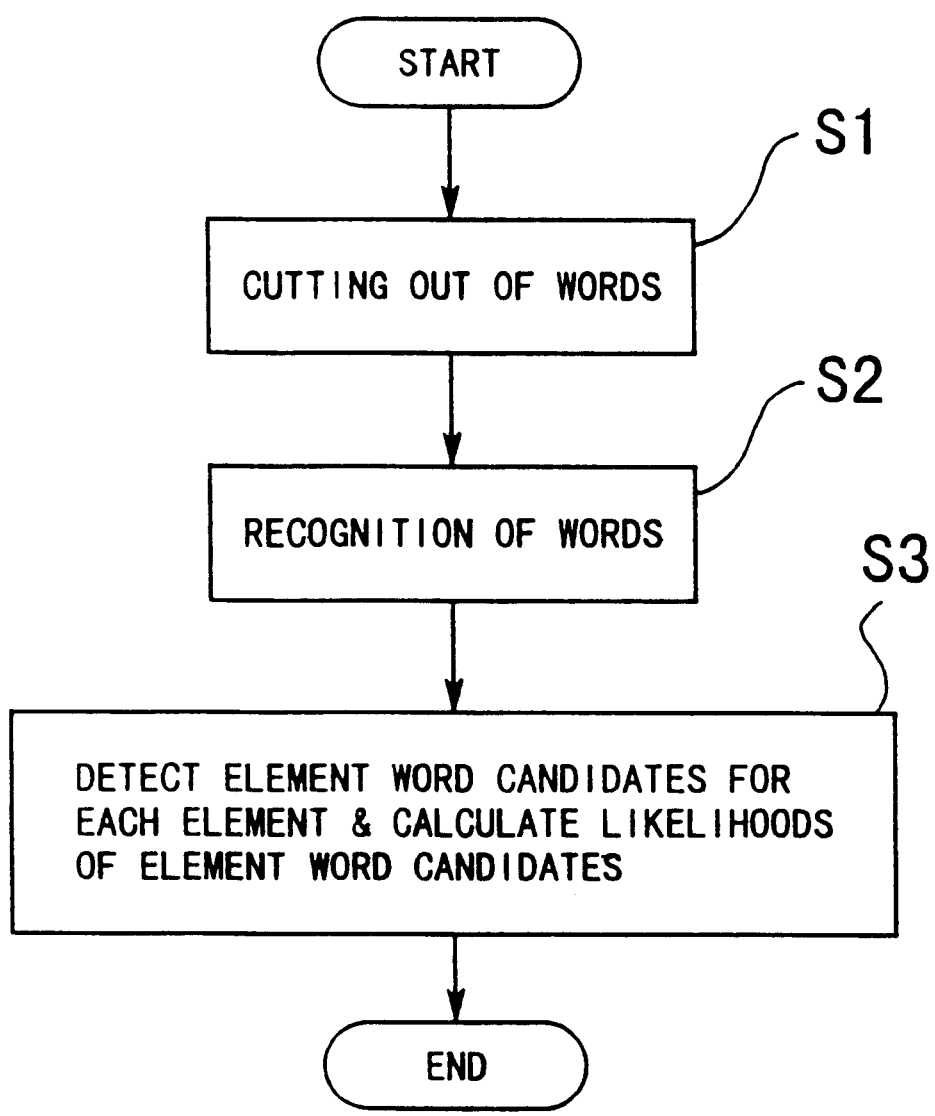
FIG. 2 is a flow chart illustrating an example of processing of an element word recognition unit of the information recognition apparatus of FIG. 1.

Referring to FIG. 2, if the input pattern as the recognition object information is inputted to the element word recognition unit 1a, then the element word recognition unit 1a first performs word cutting out processing and then performs recognition processing for the thus cut out words (steps S1 and S2). Upon such recognition processing, the element word recognition unit 1a determines likelihoods of results of recognition of the words.

Thereafter, the element word recognition unit 1a detects element word candidates for each of elements based on a result of recognition of each word, the stored contents of the rule storage unit 1b and the stored contents of the word storage unit 1c, and outputs the thus element word candidates to the record number acquisition unit 1d (step S3). In this instance, the element word recognition unit 1a simultaneously calculates adaptations between the detected element word candidates and the element words stored in the word storage unit 1c and adaptations between the detected element word candidates and the rules stored in the rule storage unit 1b, and further calculates likelihoods of the element word candidates based on likelihoods of recognition results for words calculated already. The element word recognition unit 1a outputs also the adaptations and likelihoods thus calculated to the record number acquisition unit 1d. It is to be noted that, as a technique for recognition of address elements, a practical technique such as a technique disclosed in "Automatic mail matter address reading and sorting machine for the Ministry of Posts and Telecommunications", NEC Engineering Report, Vol. 44, No. 3, pp.25–30 or "Automatic mail matter address reading and sorting machine", Toshiba Review, Vol. 45, No. 2, pp.149–152 is available.

FIG. 8 shows an example of output of the element word recognition unit 1a regarding the address shown in FIG. 7. Referring to FIG. 8, from the example shown, it can be seen that, for the place name, element name candidates "宮崎" (Miyazaki), "宮前平" (Miyamaedaira) and "有馬" (Arima) whose likelihoods are "10", "8" and "4", respectively, are outputted; for the block number", an element word candidate "4" whose likelihood is "10" is outputted; for the sub-block number", element word candidates "7" and "17" whose likelihoods are "10" and "7" are outputted; for the house number and the building name, the symbol "?" representing that there is no element word candidate and the likelihood "0" are outputted; for the room number, element word candidates "207" and "201" whose likelihoods are "10" and "5" are outputted; and for the individual name, element word candidates "日電太郎" (Nichiden Taro) and "日電次郎" (Nichirai Jiro) whose likelihoods are both "10" are outputted. Here, for the building name, the symbol "?" representing that there is no element word candidate is outputted since the building name was omitted when the address shown in FIG. 7 was written, and for the house number, the symbol "?" representing that there is no element word candidate is outputted since, although the house number is written, it is not impossible to recognize it. Further, while, in the example shown FIG. 8, element word candidates are outputted only for the elements in the layers of and lower than the district name, this is because the recognition object is an address in "川崎市宮前区" (Kawasaki-shi, Miyamae-ku).

Figure 3:
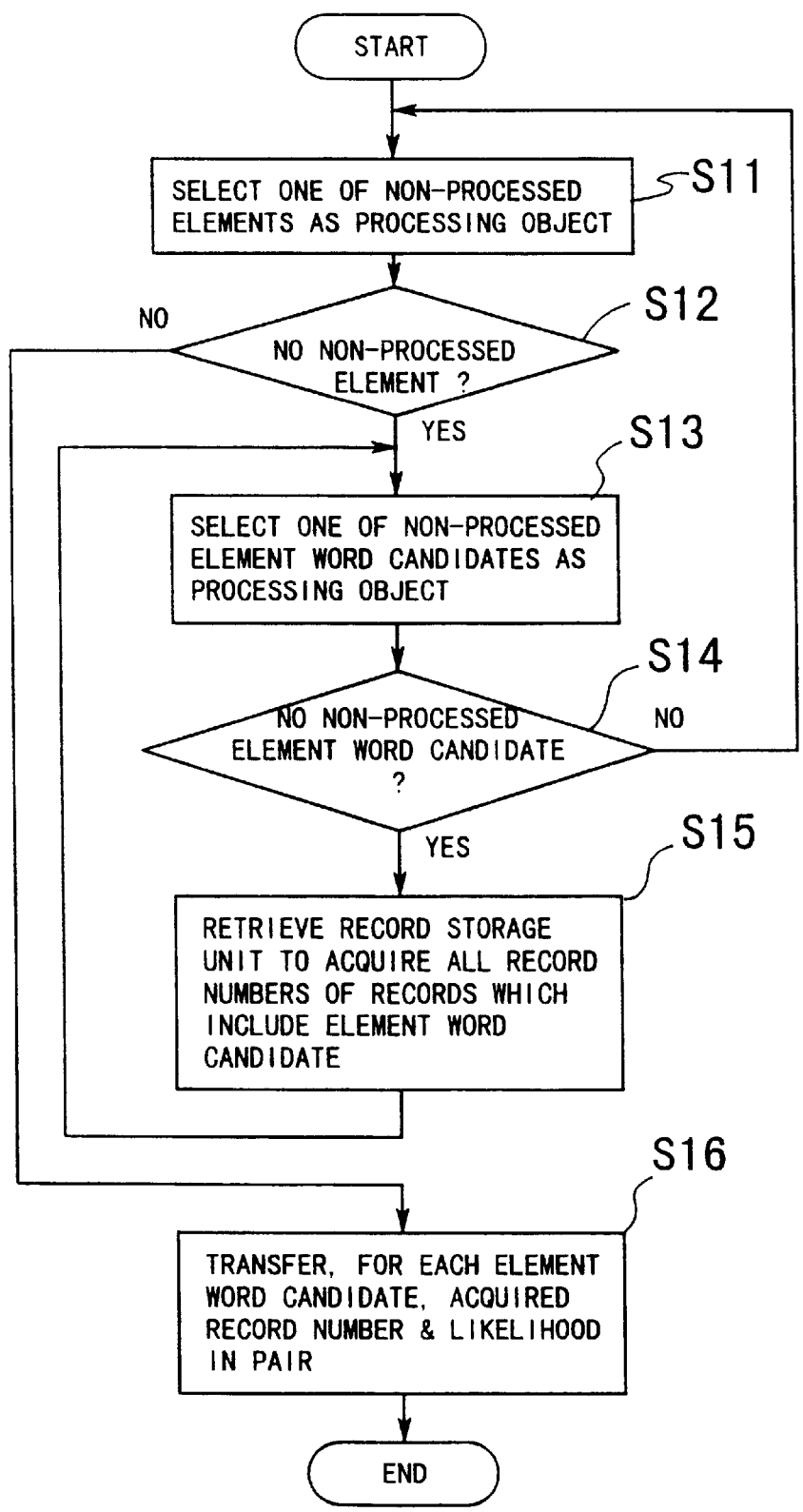
FIG. 3 is a flow chart illustrating an example of processing of a record number acquisition unit of the information recognition apparatus of FIG. 1.

If the information illustrated in FIG. 8 is outputted from the element word recognition unit 1a, then the record number acquisition unit 1d performs such processing as illustrated in the flow chart of FIG. 3.

Referring to FIG. 3, the record number acquisition unit 1d first selects one of the place name, block number, sub-block number, house number, building name, room number and individual name as a processing object (step S11). Here, it is assumed that the district name is determined as a processing object.

Then, the record number acquisition unit 1d selects one of the element candidate words "宮崎" (Miyazaki), "宮前平" (Miyamaedaira) and "有馬" (Arima) for the place name as a processing object (step S13). It is assumed here that, for example, "宮崎" (Miyazaki) is selected as a processing object.

Thereafter, the record number acquisition unit 1d retrieves the record storage unit 1e using the element word candidate "宮崎" (Miyazaki), which has been selected as a processing object", as a key and acquires all record numbers of records which include "宮崎" (Miyazaki) in the record item of the place name (step S15). It is assumed that, as a result of the retrieval, for example, "2014 to 3500" are acquired as record numbers of records which include "宮崎" (Miyazaki) in the record item of the place name.

FIG. 9 is a diagrammatic view illustrating an example of contents of the record storage unit 1e. Referring to FIG. 9, the records stored in the record storage unit 1e are composed of the record items of "record number", "place name", "block name", "sub-block name", "house name", "building name", "room number" and "individual name". It is to be noted that each record item which is blank in FIG. 9 represents that there is no pertaining element.

Thereafter, the record number acquisition unit 1d performs processing similar to that described above successively determining the element word candidates "宮前平" (Miyamaedaira) and "有馬" (Arima) for the "place name" as a processing object (steps S13 to S15).

Then, after the processing for all of the element word candidates for the "district name" is completed (YES in step S14), then the record number acquisition unit 1d now determines one of the remaining elements which have not been processed as yet as a processing object (step S11), and performs similar processing to that described above for the new processing object (steps S13 to S15).

After the processing described above is completed for all of the pertaining elements (YES in step S12), the record number acquisition unit 1d transfers, for each of the element word candidates, the likelihood and the record number acquired in step S15 in pair to the likelihood calculation unit 1f (step S16).

FIG. 10 illustrates an example of output of the record number acquisition unit 1d. As seen from FIG. 10, from the record number acquisition unit 1d, the pairs of the record numbers "0001 to 0523" of the records which include "有馬" (Arima) for the record item of "place name" and the likelihood "4", the pairs of the record numbers "2014 to 3500" of the records which include "宮崎" (Miyazaki) for the record item of "place name" and the likelihood "10", and so forth, are outputted.

It is to be noted that, in order to allow high speed retrieval processing of the record number acquisition unit 1d, a data structure for retrieval such as, for example, a hash table may be prepared separately as is employed in an ordinary data base. Or, for all element word candidates which may possibly be outputted from the element word recognition unit 1a, a record number list of records including the elements of them may be prepared. Where a record number list of the type just mentioned is prepared, although the acquisition processing time for a record number is reduced significantly, a storage region for storing a corresponding relationship between the element words and the record numbers is required. Accordingly, preferably a record list for all element words is provided or a record list only for some of element words is provided taking the number of records stored in the record storage unit 1e, the number of kinds of element words and hardware restrictions into consideration.

Figure 4:
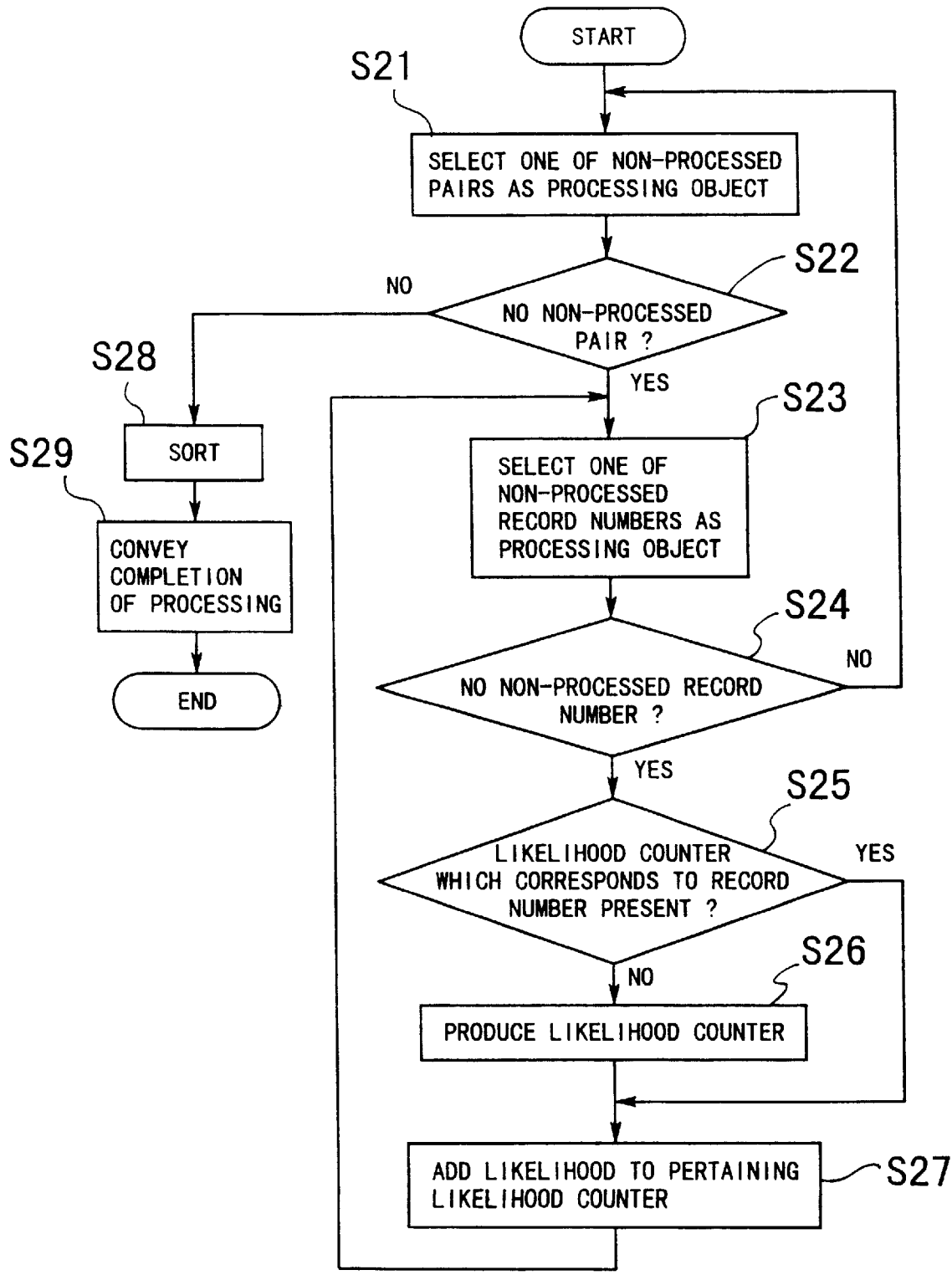
FIG. 4 is a flow chart illustrating an example of processing of a likelihood calculation unit of the information recognition apparatus of FIG. 1.

If a plurality of record number-likelihood pairs are outputted as seen from FIG. 10 from the record number acquisition unit 1d, then the likelihood calculation unit 1f selects, as seen from the flow chart of FIG. 4, one of the pairs, which have not been processed as yet by the likelihood calculation unit 1f, as a processing object (step S21). Now, it is assumed that, for example, the pair of the record numbers "0001 to 0523" and the likelihood "4" from among the pairs of record numbers and likelihoods illustrated in FIG. 10 is selected as a processing object.

Then, the record number acquisition unit 1d selects one of the record numbers "0001 to 0523" included in the processing object pair as a processing object (step S23). Now, it is assumed that, for example, the record number "0001" is selected as a processing object.

Thereafter, the record number acquisition unit 1d discriminates whether or not a likelihood counter corresponding to the record number "0001" selected as a processing object has been produced already in the likelihood storage unit 1g (step S25).

Figure 11:
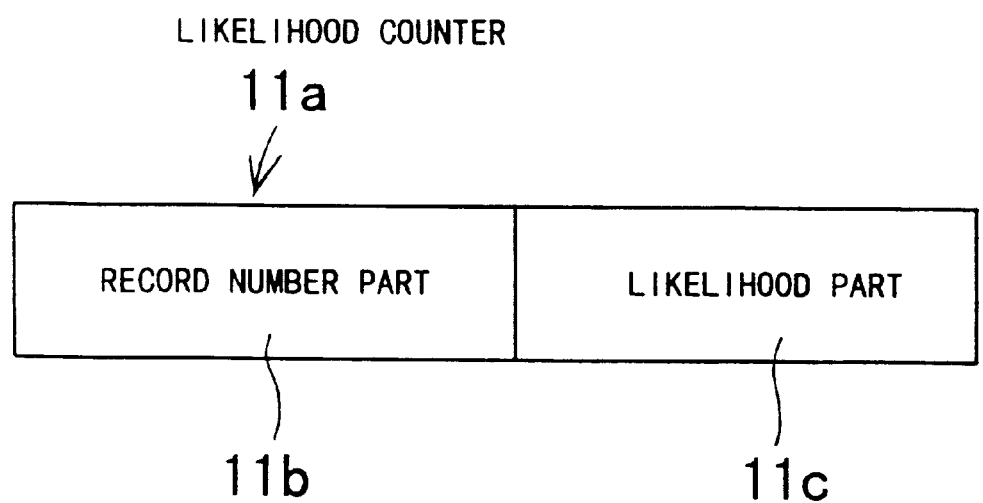
FIG. 11 is a diagrammatic view showing a construction of an example of likelihood counter of the information recognition apparatus of FIG. 1.

Then, if it is discriminated that such likelihood counter has not been produced as yet (NO in step S25), the record number acquisition unit 1d produces such a likelihood counter 11a as illustrated in FIG. 11 in the likelihood storage unit 1g (step S26). The likelihood counter 11a is formed from a record number part 11b and a likelihood part 11c. The record number part 11b stores the record number "0001" determined as its current processing object, and the likelihood part 11c stores an initial value "0".

After the likelihood counter 11a corresponding to the record number "0001" is produced in the likelihood storage unit 1g, the likelihood calculation unit 1f adds the likelihood "4" included in the current processing object pair to the likelihood part 11c of the likelihood counter 11a (step S27). It is to be noted that, when it is discriminated in step S25 that a likelihood counter corresponding to the record number of the current processing object has been produced already, the processing in step 27 is performed immediately without performing the processing in step S26.

Thereafter, the likelihood calculation unit 1f performs similar processing to that described above for those of the record numbers included in the current processing object pair for which the processing has not been performed as yet (steps S23 to S27).

Then, after the processing described above is completed for all of the record numbers included in the current processing object pair (YES in step S24), then similar processing to that described above is performed for one of the remaining ones of the pairs (steps S21 to S27).

Figure 12:
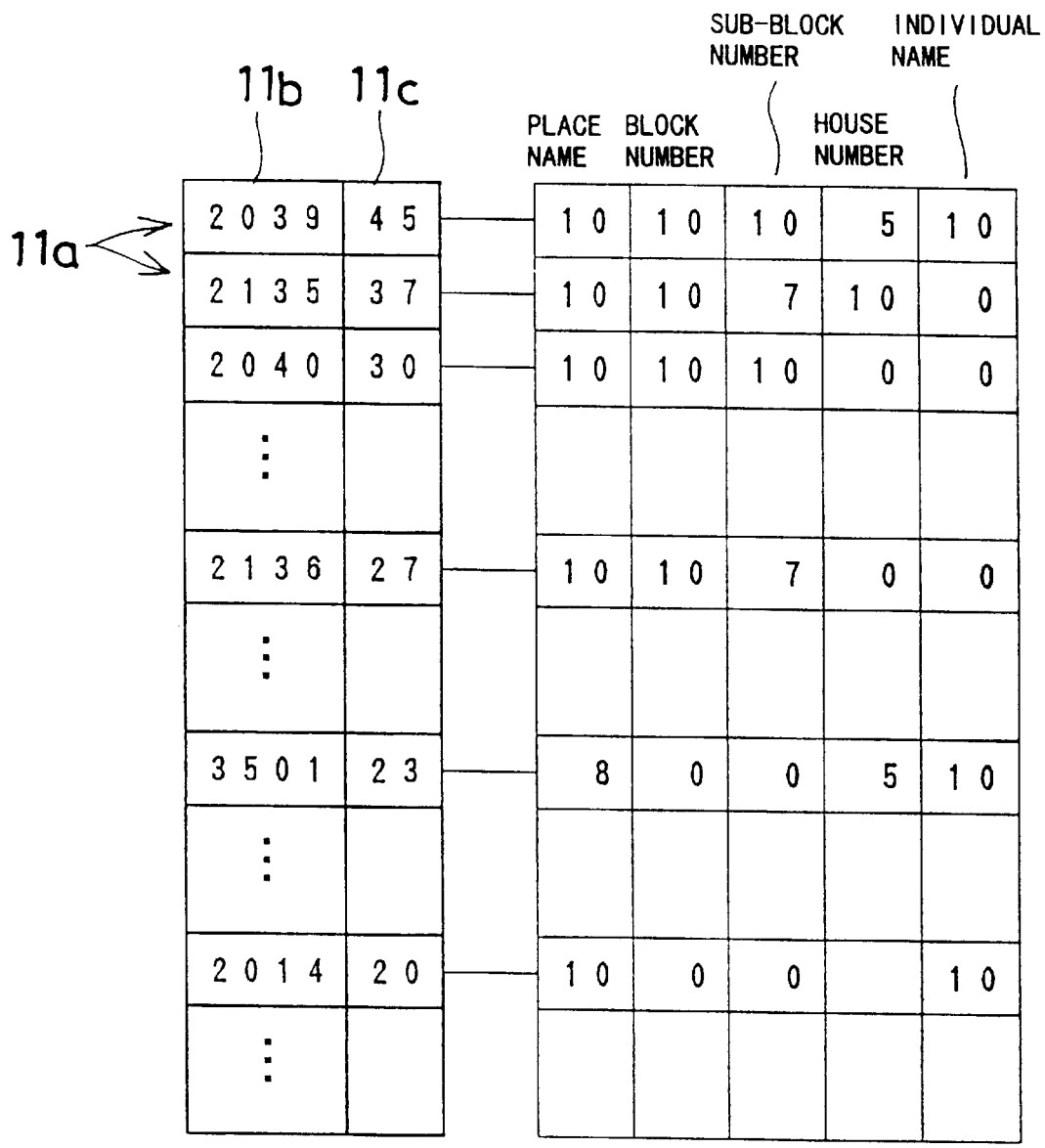
FIGS. 12 and 13 are diagrammatic views illustrating processing of the likelihood calculation unit shown in FIG. 1.

After the processing described above is performed all of the record number-likelihood pairs transferred from the record number acquisition unit 1d (YES in step S22), the likelihood calculation unit 1f sorts the likelihood counter 11a present in the likelihood storage unit 1g in a descending order of the likelihood set in the likelihood part 11c as seen in FIG. 12, and then conveys completion of processing to the result discrimination unit 1h (steps S28 and S29). It is to be noted that, while also contents of addition of likelihoods are illustrated in FIG. 12, this illustration is provided in order to facilitate understanding, and they are not actually stored in the likelihood storage unit 1g.

Figure 5:
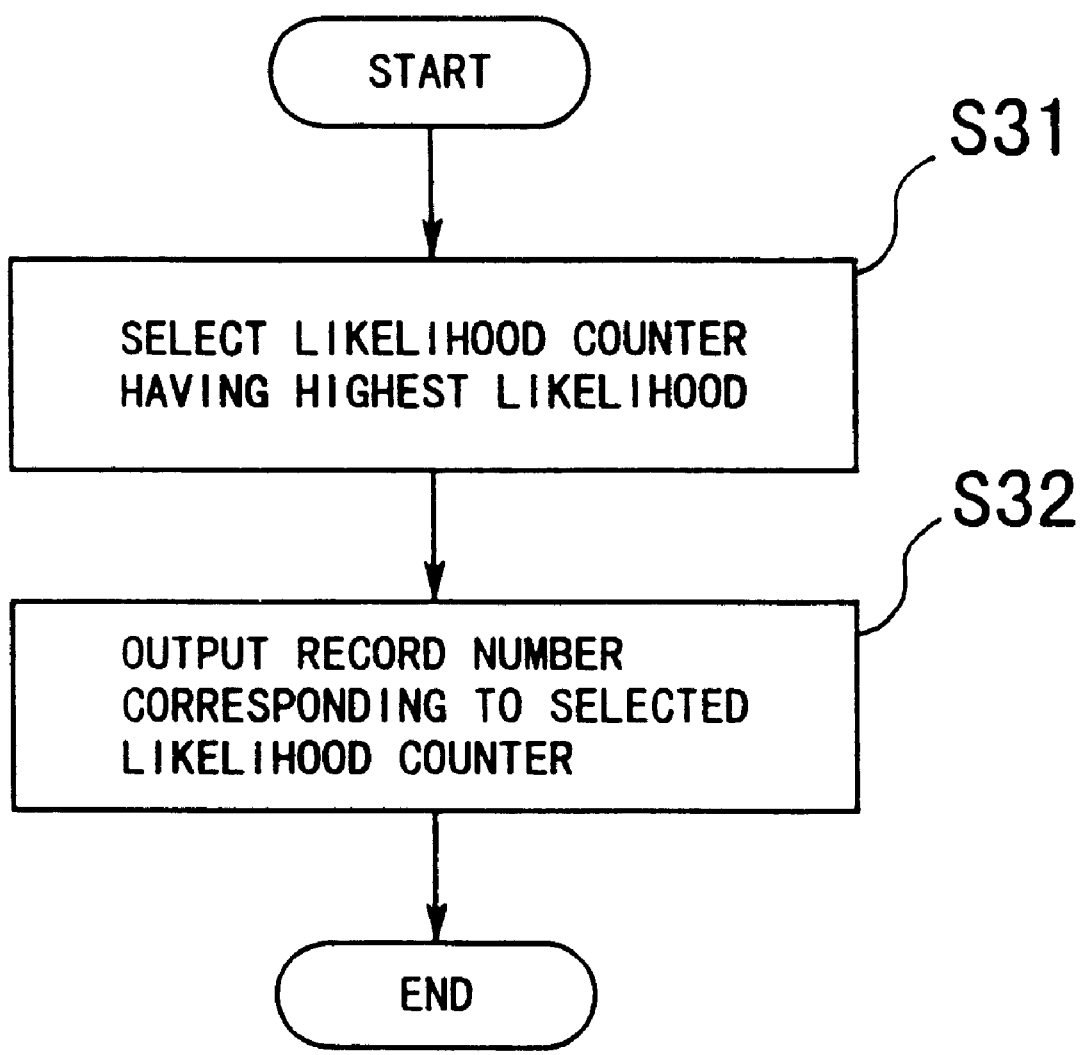
FIG. 5 is a flow chart illustrating an example of processing of a result discrimination unit of the information recognition apparatus of FIG. 1.

When the completion of processing is conveyed from the likelihood calculation unit 1f, the result discrimination unit 1h selects, as seen from the flow chart of FIG. 5, one of the likelihood counters 11a present in the likelihood storage unit 1g in which the highest likelihood value is stored in the likelihood part 11c (step S31) and outputs the record number stored in the record number part 11b of the selected likelihood counter 11a as a record number of a record which is determined as a recognition result (step S32). While, in the present embodiment, a record number corresponding to the likelihood counter 11a which has the highest likelihood value set in the likelihood part 11c is outputted unconditionally as described above, a record number may otherwise be outputted conditionally. In this instance, the following construction may be employed. In particular, first and second threshold values Th1 and Th2 are determined in advance, and only when the difference of the likelihood set in the record number part 11b of a likelihood counter (first candidate likelihood counter) in whose record number part 11b the highest likelihood is set from the likelihood set in the record number part 11b of another likelihood counter (second candidate likelihood counter) in whose record number part 11b the second highest likelihood is set is higher than the first threshold value Th1 and the likelihood set in the record number part 11b of the first candidate likelihood counter is higher than the second threshold value Th2, the record number set in the record number part 11b of the first candidate likelihood counter is outputted to the result discrimination unit 1h, but in any other case, a recognition failure is conveyed to the result discrimination unit 11h. This construction can reduce the possibility that a wrong recognition result may be outputted.

Figure 6:
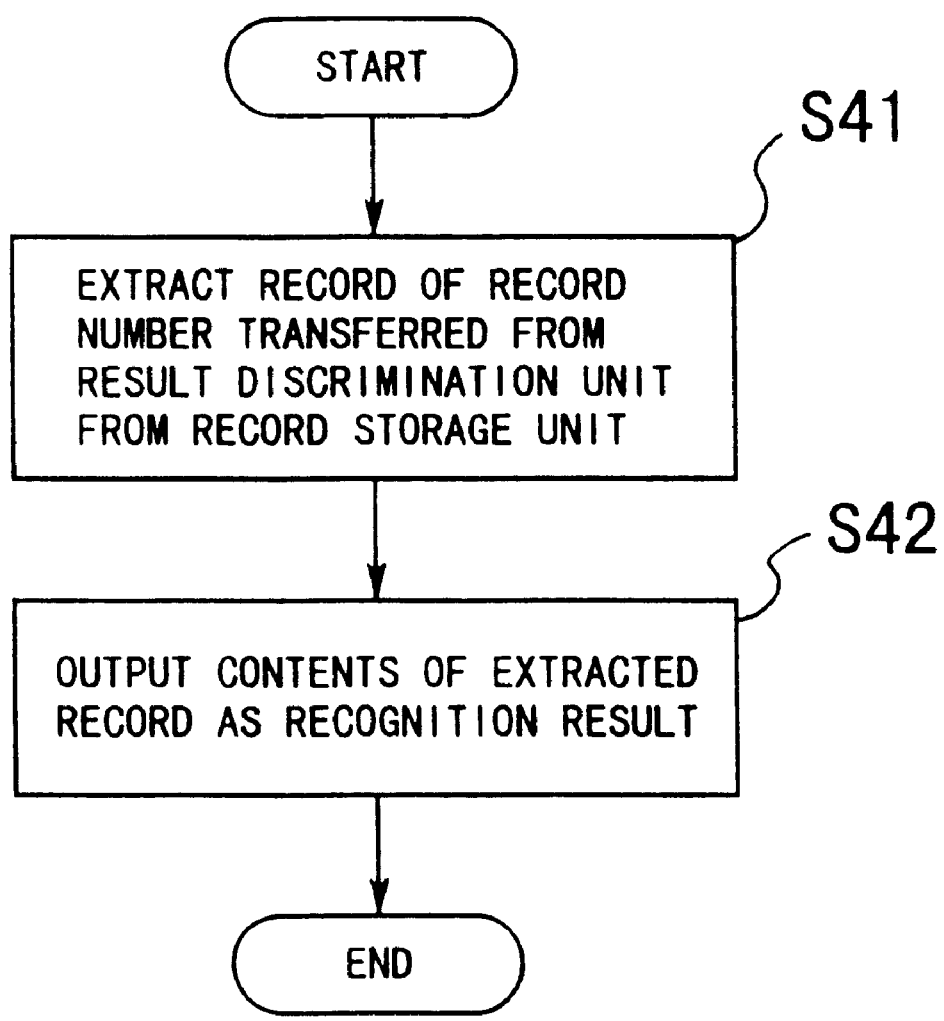
FIG. 6 is a flow chart illustrating an example of processing a result extraction unit of the information recognition apparatus of FIG. 1.

When a record number is outputted from the result discrimination unit 1h, the result extraction unit 1i extracts, as seen from the flow chart of FIG. 6, the record of the record number from the record storage unit 1e and outputs contents of the extracted record as a recognition result (steps S41 and S42).

While, in the information recognition apparatus of the present embodiment, the range of the recognition of the address is limited to the inside of Kawasaki-shi, Miyamae-ku, the range can be expanded readily. In particular, while, in the information recognition apparatus of the present embodiment, selecting the address elements in the layers of and lower than the district name as an object, the record number acquisition unit 1d acquires record numbers and the likelihood calculation unit 1f performs addition of likelihoods, processing may be performed regarding also the names of a prefecture and a municipal district recognized by the element word recognition unit 1a as address elements. The processing need not be modified even if the same street name is included in different municipal districts. However, naturally it is required to add the names of prefectures, districts and so forth for an object of recognition to the word storage unit 1c and the record storage unit 1e.

Figure 13:
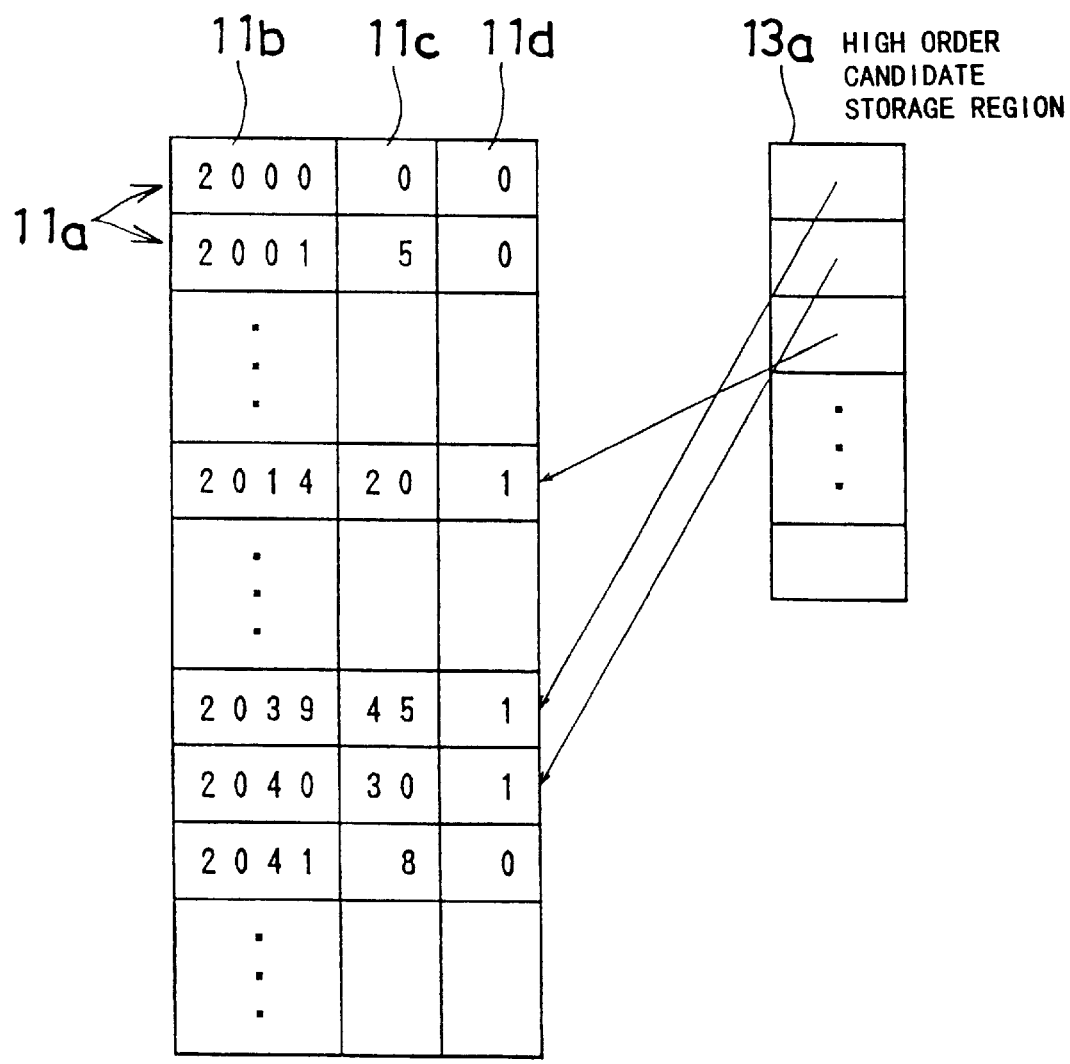

Further, while it is possible with the information processing apparatus of the present embodiment to efficiently select a most likely record from among a plurality of combinations of element word candidates, there is a problem in that, as the number of records of addresses which make an object increases, the load of likelihood comparison processing after addition processing increases. While, in the example illustrated in FIG. 12, the likelihood counters are sorted based on the likelihoods set in the likelihood parts thereof, the required number of the likelihood counters is equal to the number of records of the record storage unit 1e in the maximum, and much time is required for sorting of the likelihood counters and extraction of candidates of comparatively high likelihoods. Usually, the number of those likelihood counters whose likelihood part has a value higher than a certain value is small, and the values of the likelihood parts of almost all of the likelihood counters are zero or low values. Taking notice of this point, the speed of processing can be increased by providing, as seen in FIG. 13, a high order candidate storage region 13a in the likelihood storage unit 1g and providing high order candidate registration completion flags 11d corresponding to the likelihood counters 11a. In this instance, each time the likelihood calculation unit 1f adds a likelihood to the likelihood part 11c of a certain likelihood counter 11a, it compares the value of the likelihood part 11c after the addition with a registration threshold value Th. Then, if the value of the likelihood part 11c is higher than the registration threshold value Th and the corresponding high order candidate registration completion flag 11d is "0" which represents that the corresponding likelihood counter 11a is not registered in the high order candidate storage region 13a, then the likelihood calculation unit 1f registers the record number stored in the record number part 11b of the likelihood counter 11a into the high order candidate storage region 13a and changes the corresponding high order candidate registration completion flag 11d from "0" representing that the corresponding likelihood counter 11a is not registered to "1" representing that the corresponding likelihood counter 11a is registered. Here, the reason why the high order candidate registration completion flags 11d are provided is that it is intended to prevent overlapping registrations of the same record number. If the processing described above is performed, then only the record numbers which correspond to those likelihood counters 11a wherein the value of the likelihood part 11c is higher than the registration threshold value Th are stored into the high order candidate storage region 13a, and consequently, the processing for extracting high order candidates is limited significantly. While, in FIG. 13, the example wherein the registration threshold value Th is "10" is illustrated, the trade-off between the processing speed and the accuracy can be set readily by changing the setting of the registration threshold value Th in accordance with situations. It is to be noted that, as the registration threshold value increases, determinations of no recognition result increase, but as the registration threshold decreases, the processing time increases.

As described above, with the information recognition apparatus of the present embodiment, a correct recognition result of an address written freely can be outputted efficiently even under such a condition that some element word is omitted when the address is written, the written address includes an element which cannot be recognized, or some element word is read in error.

Figure 14:
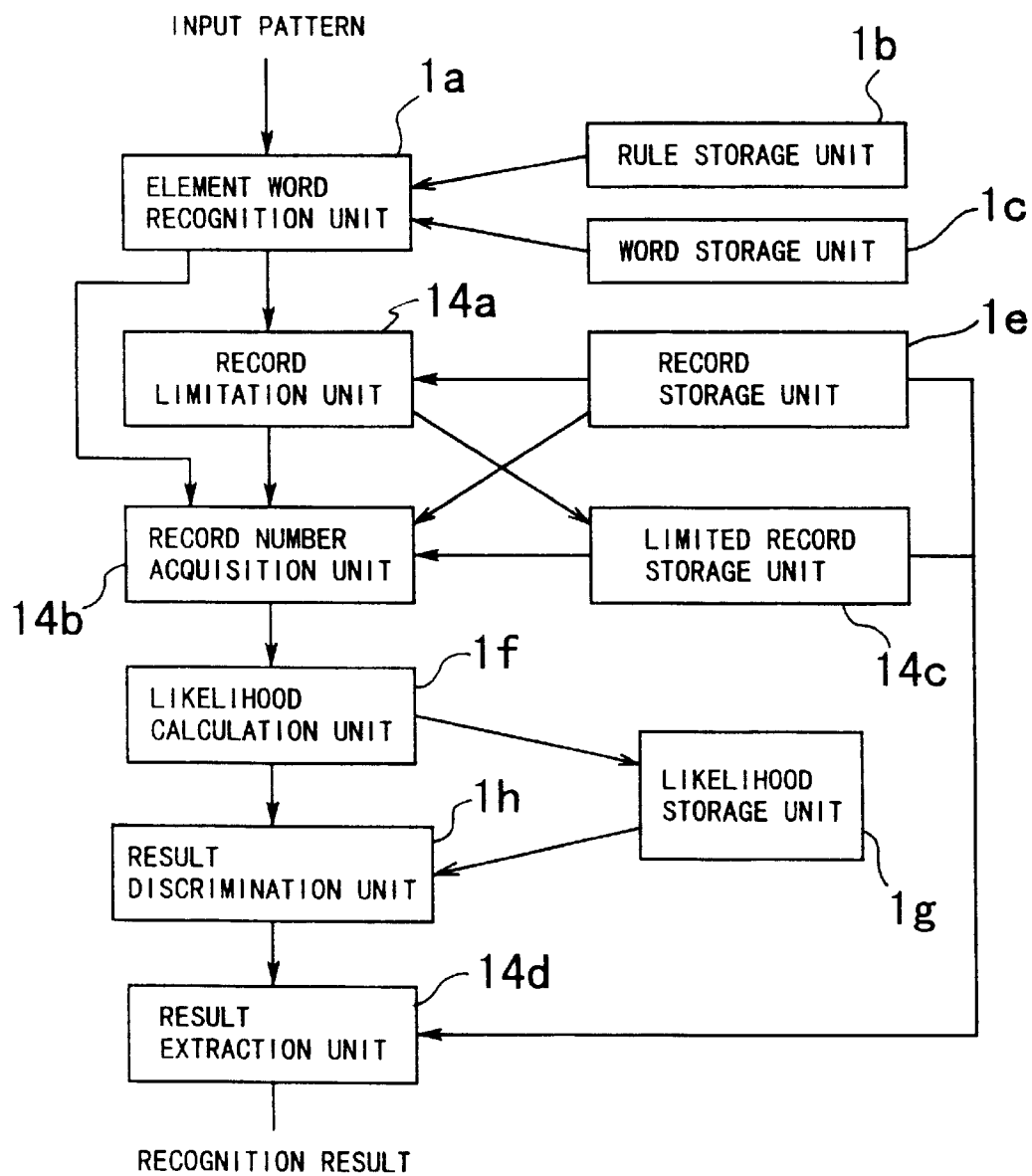
FIG. 14 is a block diagram of another information recognition apparatus showing a second preferred embodiment of the present invention.

FIG. 14 shows in block diagram another information recognition apparatus to which the present invention is applied. The information recognition apparatus of the present embodiment is a modification to and has several common components to those of the information recognition apparatus of the first embodiment described above with reference to FIG. 1. The information recognition apparatus of the present embodiment is different from the information recognition apparatus of the first embodiment in that it additionally includes a record limitation unit 14a and a limited record storage unit 14c, and it includes a record number acquisition unit 14b and a result extraction unit 14d in place of the record number acquisition unit 1d and the result extraction unit 1i, respectively.

The record limitation unit 14a has the following functions. In particular, if element word candidates detected by the element word recognition unit 1a include an element word candidate which corresponds to a record item which has a high likelihood and includes a word which is not frequently included in element words, the record limitation unit 14a stores a record obtained by retrieving the record storage unit 1e using the element word candidate as a key and including the element word candidate into the limited record storage unit 14c, and instructs the record number acquisition unit 14b to determine the limited record storage unit 14c as an object of retrieval. However, if an element word candidate which satisfies the condition described above is not detected, then the record limitation unit 14a instructs the record number acquisition unit 14b to determine the record storage unit 1e as an object of retrieval.

The record number acquisition unit 14b has the following functions. In particular, when the record number acquisition unit 14b is instructed to determine the record storage unit 1e as an object of retrieval, it retrieves the record storage unit 1e using the element word candidates detected by the element word recognition unit 1a successively as a key to acquire, for each of the element word candidates, a record number of a record including the element word candidate. However, if the record number acquisition unit 14b is instructed to determine the limited record storage unit 14c as an object of retrieval, it retrieves the limited record storage unit 14c using the element word candidates detected by the element word recognition unit 1a successively as a key to acquire, for each of the element word candidates, a record number of a record including the element word candidate.

The result extraction unit 14d has a function of extracting a record to be determined as a recognition result from the limited record storage unit 14c based on a record number as a recognition result of the result discrimination unit 1h.

Figure 15:
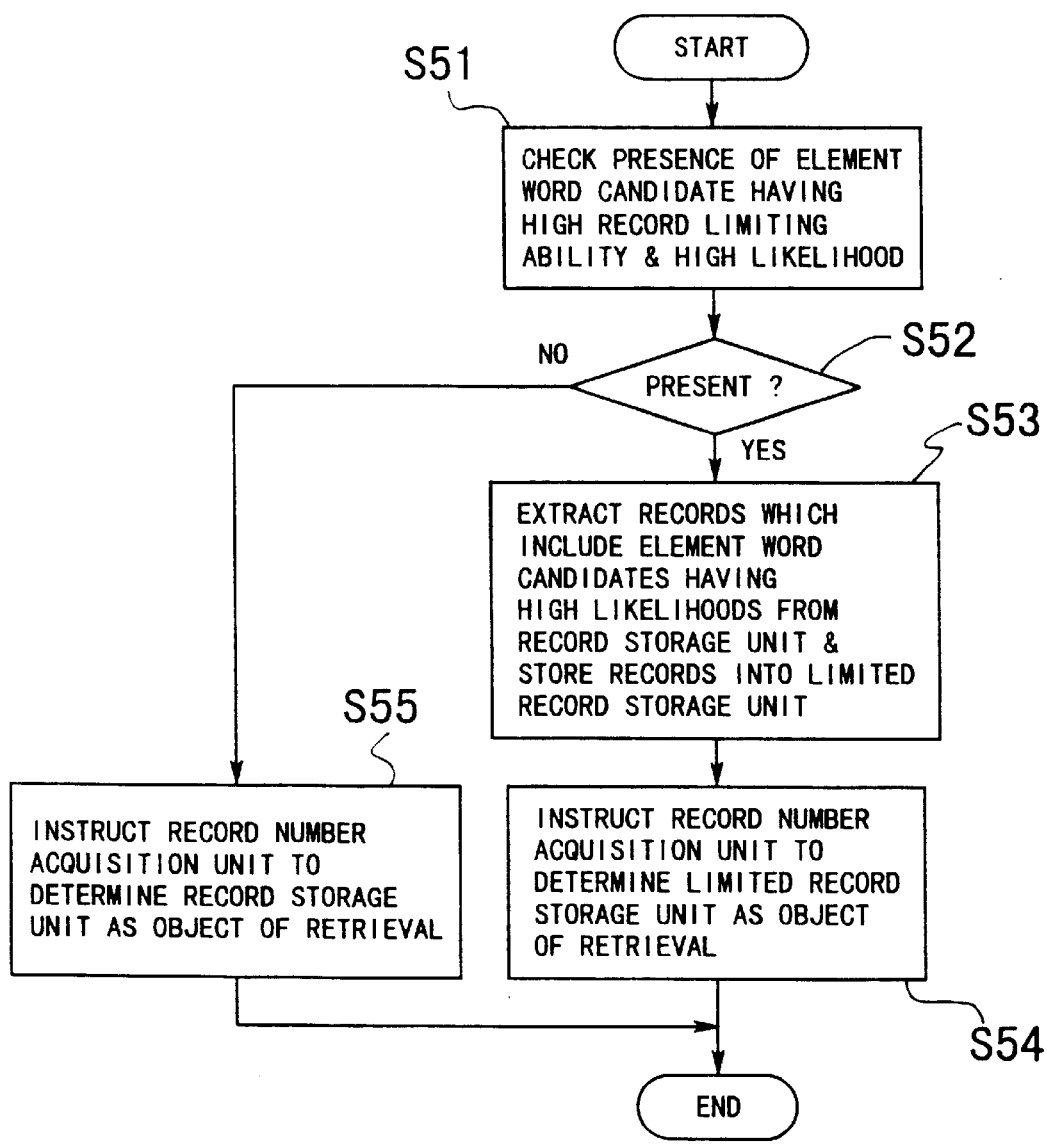
FIG. 15 is a flow chart illustrating an example of operation of a record limitation unit of the information recognition apparatus shown in FIG. 14.

FIG. 15 illustrates in flow chart an example of processing of the record limitation unit 14a. Operation of the information recognition apparatus of the present embodiment is described below with reference to FIGS. 14 and 15.

Elements which construct an address or transaction data have abilities of limiting pertaining records which are frequently different among different kinds of the elements. If, for example, an address is taken as an example, records cannot be limited significantly with the municipal district name, the block number, the room number or the like, the individual name or the building name has a high effect of limiting records if it is recognized correctly. Accordingly, if an element having a high record limiting ability can be recognized correctly, then by limiting the range of records to be processed with the recognized element and performing processing based on the remaining words for the range, the processing amount can be reduced remarkably. The information recognition apparatus of the present embodiment is constructed taking notice of this point.

Referring to the flow chart of FIG. 15, when element word candidates are outputted from the element word recognition unit 1a, the record limitation unit 14a checks whether or not the element word candidates include an element word candidate which has a high likelihood and has a high record limiting ability (step S51).

Then, if an element word candidate which satisfies the conditions described above is not detected (NO in step S51), then the record limitation unit 14a instructs the record number acquisition unit 14b to determine the record storage unit 1e as an object of retrieval (step S55). The record number acquisition unit 14b performs, when it is instructed to determine the record storage unit 1e as an object of retrieval, processing similar that of the record number acquisition unit 1d shown in FIG. 1.

On the other hand, if an element word candidate which satisfies the conditions described above is detected (YES in step S52), then the record limitation unit 14a extracts all of records which include the high order element word candidates described above from the record storage unit 1e and stores the extracted records into the limited record storage unit 14c (step S53). Thereafter, the record limitation unit 14a instructs the record number acquisition unit 14b to determine the limited record storage unit 14c as an object of retrieval (step S54). Consequently, the record number acquisition unit 14b retrieves the limited record storage unit 14c using the element word candidates detected by the element word recognition unit 1a successively as a key and acquires record numbers of records including the element word candidates.

The likelihood calculation unit 1f and the result discrimination unit 1h perform similar processing to that described hereinabove, and the record number acquisition unit 1d extracts a record corresponding to a record number outputted from the result discrimination unit 1h from the limited record storage unit 14c and outputs the extracted record as a recognition result. It is to be noted that, although records corresponding to record numbers outputted from the result discrimination unit 1h may alternatively be extracted from the record storage unit 1e, since the limited record storage unit 14c includes a smaller number of stored records than the record storage unit 1e, the processing can be performed at a higher speed where records are extracted from the limited record storage unit 14c.

By the way, since, in the information recognition apparatus of the present embodiment, records to be made an object of processing are limited depending upon a particular element word, there is a problem that the accuracy in recognition of an element word used for the limitation has a significant influence on the accuracy of recognition of the entire apparatus. In order to solve this problem, such a countermeasure can be taken that the first and second threshold values Th1 and Th2 of the result discrimination unit 1h are set so high that, if the likelihood is not sufficiently high or the difference between the likely hood set in the first candidate likelihood counter and the likelihood set in the second likelihood counter is not sufficiently high, determination of rejection is made positively. Further, in order to keep the balance between the average speed and accuracy of the entire system, if rejection occurs as a result of such severe determination, then such a countermeasure may be taken as to perform processing using the record storage unit 1e in a similar manner as in the information recognition apparatus of the first embodiment without using the limited record storage unit 14c.

Figure 16:
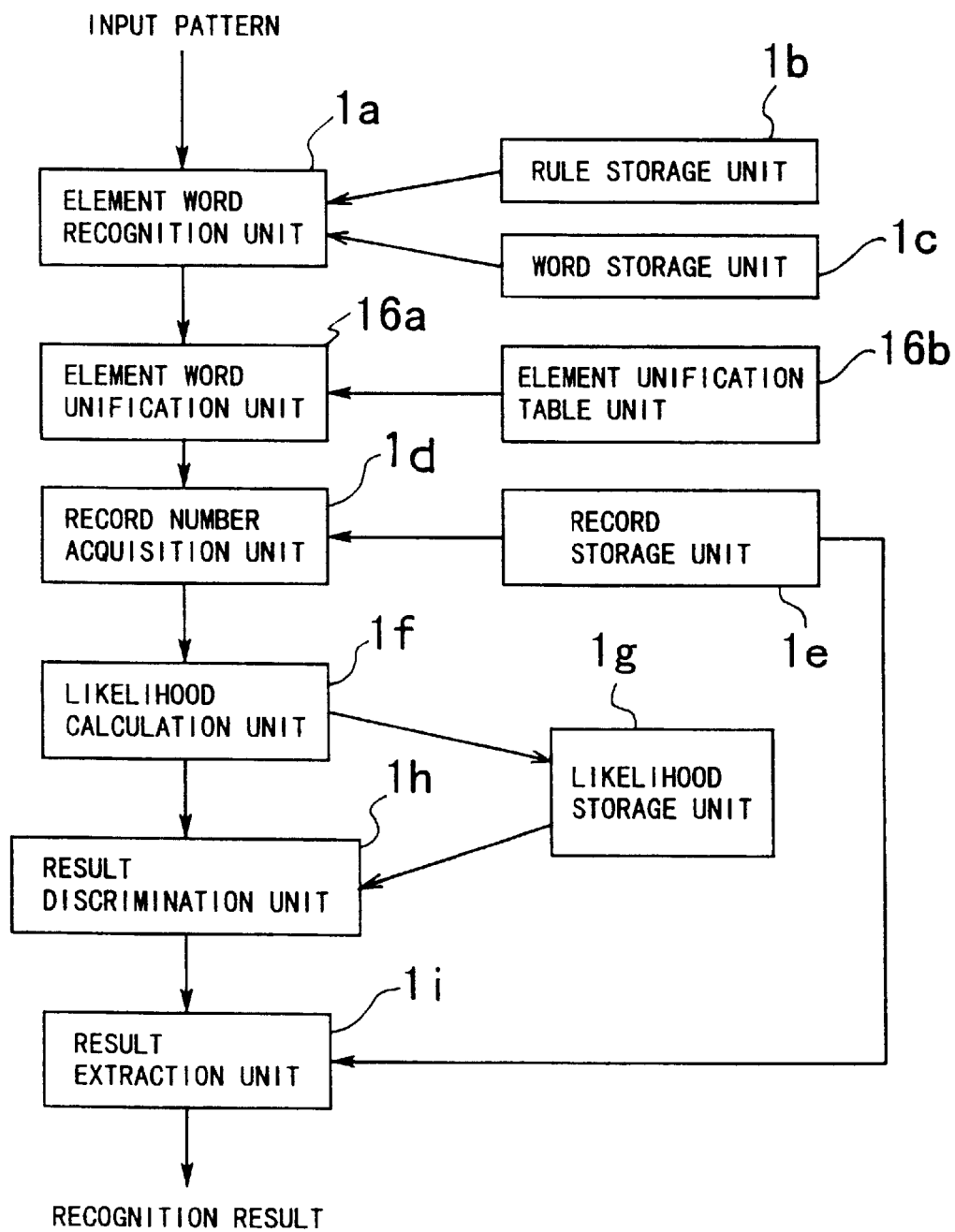
FIG. 16 is a block diagram of a further information recording apparatus showing a third preferred embodiment of the present invention.

FIG. 16 shows in block diagram a further information recognition apparatus to which the present invention is applied. Also the information recognition apparatus of the present embodiment is a modification to and has several common components to those of the information recognition apparatus of the first embodiment described above with reference to FIG. 1. The information recognition apparatus of the present embodiment, however, is different from the information recognition apparatus of the first embodiment in that it additionally includes an element word unification unit 16a and an element unification table unit 16b.

The element unification table unit 16b stores representative representations and deformation representations of element words in a corresponding relationship to each other.

The element word unification unit 16a has functions of discriminating, for each of element word candidates detected by the element word recognition unit 1a, whether it is a representative representation or a deformation representation based on the contents of the element unification table unit 16b and outputting, when the element word candidate is a representative representation, the element word candidate as it is, but outputting, when the element word candidate is a deformation representation such as a different inscription, the element word candidate after it is converted into an element word candidate of a representative representation.

In an address or the like, element words having the same meaning sometimes have different representations. For example, "日の出町" (Hinode-cho or Hinode-machi) is sometimes represented as "日之出町" (Hinode-cho or Hinode-machi), "日ノ出町" (Hinode-cho or Hinode-machi) or the like. Further, an address and an individual name are sometimes written in 'katakana'. Or, when a squire is represented in a character train, a numeral may be represented in an Arabic numeral or a numeral of 'kanji'. The element word unification unit 16a unifies a plurality of such representations into a representative representation used by the record storage unit 1e. Consequently, there is no necessity of storing a record which includes a different inscription into the record storage unit 1e, and this allows saving of the storage capacity and the processing time. It is to be noted that the other processing of the information recognition apparatus of the present embodiment is same as that of the information recognition apparatus of the first embodiment.

FIG. 17 illustrates an example of contents of the element unification table unit 16b. Where the element unification table unit 16b has such contents as seen in FIG. 17, whichever one of "日の出町" (Hinode-cho), "日之出町" (Hinode-cho), "日ノ出町" (Hinode-cho) and "ヒノデチョウ" (Hinode-cho) is outputted from the element word recognition unit 1a, it is unified into "日の出町" (Hinode-cho). Consequently, it is required to register only those records which use "日の出町" (Hinode-cho) in the record storage unit 1e. Further, the element word unification unit 16a need not necessarily unify character trains of an element word stored in the word storage unit 1c into one of them, but it may alternatively unify them into a certain identification code. In this instance, however, it is required to store not the element word but the identification code in the record storage unit. Further, if an identification code is stored not as character train data but as numerical value data in the record storage unit 1e, then the storage amount of the record storage unit 1e can be reduced.

When it is tried to unify character trains of a name of a place, preferably the system which employs the element unification table unit 16b is preferable as described hereinabove. However, for a numeral train for representation of a square, it is more practical to prepare a conversion unit for converting a numeral of 'kanji' into an Arabic numeral or for converting an Arabic numeral into a numeral of 'kanji' in the element word unification unit 16a than the system which employs the element unification table unit 16b.

Due to the processing described above, even if an element word appears in a representation different from a representative representation, the recognition object information can be recognized efficiency and with a high degree of recognition.

It is to be noted that, while, in the embodiments described above, each word in an input pattern is recognized using a character recognition technique, where the input pattern is a speech pattern, it is possible to recognize each word in the input pattern using a speech recognition technique.

Having now fully described the invention, it will be apparent to one of ordinary skill in the art that many changes and modifications can be made thereto without departing from the spirit and scope of the invention as set forth herein.

What is claimed is:

1. An information recognition apparatus for recognizing recognition object information in the form of a series of pieces of information which is composed of a plurality of information elements for each of which a predetermined number of element words each of which can make the information element are determined, comprising:

a word storage section in which all element words which can make the information elements are stored;

a rule storage section in which rules representing a hierarchical relationship of the information elements are stored;

element word recognition means for recognizing words in recognition object information, detecting, for each of the information elements in the recognition object information, element word candidates based on a result of the recognition, the stored contents of said word storage section and the stored contents of said rule storage section and detecting likelihoods of the element word candidates;

a record storage section in which actually existing recognition object information which can be represented as combinations of element words is stored in the form of records each of which includes record items provided by the information elements of the recognition object information;

record number acquisition means for retrieving said record storage section using the element word candidates detected by said element word recognition means successively as a key to acquire, for each of the element word candidates, a record number of a record which includes the element word candidate;

likelihood calculation means for providing likelihood counters in a corresponding relationship to the individual record numbers acquired by said record number acquisition means and adding the likelihoods of the element word candidates detected by said element word recognition means to those of said likelihood counters which correspond to the record numbers of the records which include the element word candidates;

result discrimination means for discriminating a record to be determined as a recognition result based on the count values of said likelihood counters; and result extraction means for extracting a record to be determined as a recognition result from said record storage section based on a result of the discrimination of said result discrimination means.

2. An information recognition apparatus as claimed in claim 1, further comprising a limited record storage section, and record limitation means for retrieving, only when the element word candidates detected by said element word recognition means include an element word candidate which has a high likelihood and corresponds to a record item in which a same word is not frequently included among different element word candidates, said record storage section using the element word candidate as a key and storing records which include the element word candidate into said limited record storage section, and wherein said record number acquisition means retrieves, when a record or records are stored in said limited record storage section, said limited record storage section using the element word candidates detected by said element word recognition means successively as a key to acquire, for each of the element word candidates, record numbers of records which include the element word candidate, but retrieves, when no record is stored in said limited record storage section, said record storage section using the element word candidates detected by said element word recognition means successively as a key to acquire, for each of the element word candidates, record numbers of records which include the element word candidate, and said result extraction means extracts a record to be determined as a recognition result from said record storage section or said limited record storage section based on a result of the discrimination of said result discrimination means.

3. An information recognition apparatus as claimed in claim 1, further comprising an element unification table section in which representative representations and deformation representations of the element words are stored in a corresponding relationship, and element word unification means for outputting those of the element word candidates detected by said element word recognition means which are represented in the representative representations as they are but outputting those of the element word candidates detected by said element word recognition means which are represented in the deformation representations after converted into element word candidates of the representative representations based on the stored contents of said element unification table section, and wherein said record number acquisition means retrieves said record storage section using the element word candidates outputted from said element word unification means successively as a key to acquire, for each of the element word candidates, a record number of a record which includes the element word candidate.

4. An information recognition apparatus as claimed in claim 1, further comprising a high order candidate storage section, and a high order candidate registration completion flag provided for each of said likelihood counters, and wherein said likelihood calculation means changes, when a likelihood is added to any of said likelihood counters, a corresponding one of the high order candidate registration completion flags so as to have a value representing completion of registration if the likelihood counter has a count value higher than a threshold value determined in advance and the high order candidate registration completion flag represents incompletion of registration, and stores a record number corresponding to the likelihood counter whose count value is higher than the threshold value into said high order candidate storage section, and said result discrimination means discriminates a record to be determined as a recognition result of the recognition object information based on the count values of the likelihood counters corresponding to the record numbers stored in said high order candidate storage section.

5. An information recognition apparatus as claimed in claim 1, wherein said element word recognition means recognizes each word in the recognition object information by character recognition.

6. An information recognition apparatus as claimed in claim 1, wherein said element word recognition means recognizes each word in the recognition object information by speech recognition.

7. An information recognition apparatus as claimed in claim 1, wherein the element words which can make elements of recognition object information stored in said word storage section include a zip code, a place name, a square, an organization name, a building name and an individual name, and the recognition object information stored in said record storage section is actually existing addresses each of which can be represented as a combination of element words.

8. An information recognition apparatus as claimed in claim 1, wherein the element words which can make elements of recognition object information stored in said word storage section include a customer and an individual name, and the recognition object information stored in said record storage section is actually existing customer transaction data each of which can be represented as a combination of element words.

* * * * *